United States Patent
Kawai et al.

[11] Patent Number: 5,620,636
[45] Date of Patent: Apr. 15, 1997

[54] PROCESS FOR MANUFACTURING FOAM MOLDED PRODUCT

[75] Inventors: Tamotsu Kawai, Settsu; Kinzo Masuda, Ibaraki; Masao Ando, Toyonaka; Fukuzo Imada, Kashihara; Masahiro Chikada, Settsu, all of Japan

[73] Assignee: Kanegafuchi Kagaku Kogyo Kabushiki Kaisha, Osaka, Japan

[21] Appl. No.: 517,851

[22] Filed: Aug. 22, 1995

Related U.S. Application Data

[63] Continuation of Ser. No. 949,638, filed as PCT/JP92/00442, Apr. 8, 1992 published as WO92/17330, Oct. 15, 1992, abandoned.

[30] Foreign Application Priority Data

Apr. 8, 1991 [JP] Japan .................................. 3-103802
Jul. 1, 1991 [JP] Japan .................................. 3-188154

[51] Int. Cl.⁶ ........................................................ B29D 9/00
[52] U.S. Cl. ........................ 264/45.4; 264/45.5; 264/45.6; 428/318.6; 428/318.8; 428/319.9
[58] Field of Search ........................... 428/318.6, 318.8, 428/319.9; 264/45.4, 45.5, 45.6

[56] References Cited

FOREIGN PATENT DOCUMENTS

| | | |
|---|---|---|
| 0368098A2 | 5/1990 | European Pat. Off. . |
| 0477476A2 | 4/1992 | European Pat. Off. . |
| 54-108871 | 8/1979 | Japan . |
| 61-242830 | 10/1986 | Japan . |
| 62-78424 | 5/1987 | Japan . |
| 62-271729 | 11/1987 | Japan . |
| 63-153120 | 6/1988 | Japan . |
| 492544 | 8/1970 | Switzerland . |
| 1122649 | 8/1968 | United Kingdom . |

Primary Examiner—Jenna Davis
Attorney, Agent, or Firm—Armstrong, Westerman, Hattori, McLeland & Naughton

[57] ABSTRACT

A foam molded product of a synthetic resin having a continuous hardened surface layer formed uniformly on a part or the whole of its surface during its foam-in-place molding and having a desired thickness. A mold and a process which can make such a product without bringing about any substantial change in an ordinary foam-molding operation. A part of foamable resin particles which are fed into the mold for making the product are caused to contact a mold surface heated to or above the melting point of the particles and melt to form a molten resin layer, and the molten resin layer is hardened to form the hardened surface layer.

7 Claims, 9 Drawing Sheets

PROCESS FOR MANUFACTURING FOAM MOLDED PRODUCT

This application is a continuation of application Ser. No. 07/949,638, filed as PCT/JP92/00442, Apr. 8, 1992 published as WO92/17330, Oct. 15, 1992, now abandoned.

TECHNICAL FIELD

This invention relates to an improvement in the foam molded product which is usually manufactured by foaming and fusing particles of a foamable synthetic resin in a foaming-in-place mold composed of two portions, but has defects depending on the purpose or state of its use, and to a process and a mold which are used for manufacturing an improved foam molded product of a synthetic resin.

BACKGROUND ART

There is known a foam molded product which is manufactured by foaming and fusing particles of a foamable synthetic resin in a foaming-in-place mold composed of two portions. These products are widely used as shock absorbing materials, containers, etc., since they are light in weight, are easy to handle, and have a good property of absorbing shock.

As the starting particles have very thin skins, however, the surface of the molded product has merely a film formed by the skins of the particles joined together like a tortoise shell. As it is not a uniformly thick film, the surface of the product cannot be said to be satisfactorily high in strength. The product is, therefore, unsuitable for some modes of use, for repeated use, or for washing with water. The rubbing or striking of something else against the surface of the product is very likely to cause the peeling of the film off its surface, or the depression of its surface. Moreover, the known product cannot necessarily be said to have a beautiful surface, since the foamed and fused particles form a pattern like a tortoise shell, or concavities in the surface of the product.

Attempts have been made to improve the drawbacks of the known product which make it useless under certain circumstances, as hereinabove stated. They include laminating a film of an unfoamed synthetic resin under heat on the surface of a molded product, or binding such a film to its surface with an adhesive, as well as melting the surface of a molded product under heat to form a film thereon. According to another attempt, a vacuum molded product is placed about a foam molded product to form a film on its surface.

According to still another attempt, an unfoamed sheet of a synthetic resin is first placed in a mold, and after the mold has been closed, particles of a foamable synthetic resin are charged into a cavity enclosed by the sheet, and an ordinary foam molding process is thereafter followed, so that the sheet may form a film on the surface of a molded product.

Further attempts are proposed in French Patent No. 1,571,274 and Japanese Patent Application Laid-Open No. 171924/1983. The French Patent discloses a foam molding process in which particles of a foamable polystyrene resin in a foaming-in-place mold are exposed to a relative pressure of 2 to 5 $kg/cm^2$ (which corresponds to the pressure prevailing when they are heated to a temperature of 140° C. to 150° C.) for 10 seconds, for which vapor having a relative pressure of 5 to 10 $kg/cm^2$ is employed, and immediately thereafter, the pressure is lowered to a level of 0 to 1.5 $kg/cm^2$ (which corresponds to the pressure prevailing when they are heated to a temperature of 105° C. to 110° C.), and is maintained at that level. This process is claimed to be capable of making a molded product having a density which is 10 to 20 times higher in its surface portion than in its inner portion. The Japanese Patent Application disclosed a process in which the surface of a foam molded product made in a customary way from particles of a foamable polypropylene resin in a foaming-in-place mold is melted by heating at a temperature of about 200° C. for a period of 30 seconds to form a film while the product stays in the mold.

The work of laminating or bonding a film of an unfoamed synthetic resin is, however, very difficult to accomplish without causing the wrinkling of the film. This is particularly the case with a molded product having a complicated shape. The melting of the surface of a molded product to form a film thereon has the drawback that the particles in its surface are difficult to melt uniformly and are likely to form a corrugated surface. In either event, and also when a vacuum molded product is employed to form a surface film, the manufacture of a final product requires a complicated process having two separate stages.

The process relying upon an unfoamed sheet of a synthetic resin placed in a mold has the drawback that firstly, its proper placement is no easy task, and that secondly, its wrinkling, for example, disables the formation of a neatly finished surface. This is particularly the case when the mold has a complicated cavity surface to make a molded product having a complicated shape.

The process disclosed in the French Patent has a number of problems, too. Although it does not contain any relevant description, it will be proper to understand that the particles forming the surface portion of a molded product do not melt, but retain their original shapes, since the particles as a whole are apparently heated to a temperature which is at least 50° C. lower than the temperature of about 200° C. considered as the melting point of the polystyrene resin. Accordingly, it is apparent that the molded product still has a surface having a pattern like a tortoise shell, or concavities formed by or between the individual particles, though its surface portion may be considerably higher in density that its inner portion. The surface portion has only a limited thickness, insofar as it is only the foaming pressure applied into the closed mold that is relied upon for achieving the higher density of that portion. The process precludes the use of any preliminarily foamed particles having a high degree of expansion, and cannot, therefore, be employed for making any product having a light weight which is an important characteristic of any ordinary foam molded product of a synthetic resin. The exposure of the particles to vapor having a high pressure, and immediately thereafter to vapor having a low pressure complicates the foam molding operation. Moreover, a high level of skill is required for carrying out the process successfully, since it is often likely that the hardening of the surface portion may occur immediately after exposure to vapor having a high pressure and prevent any satisfactory permeation of vapor to the inner portion.

The melting of the surface of the molded product as proposed by the Japanese Patent Application is likely to result in the failure to form a uniform film having no discontinuous portion on the surface of the product, or the formation of voids between the film and the underlying foamed and fused particles, due to the air staying in the particles after replacing a part or all of a foaming agent during the process of their foaming and fusing. Moreover, the proposed method can form only a film having a limited thickness.

DISCLOSURE OF THE INVENTION

In view of the drawbacks of the prior art as hereinabove pointed out, it is an object of this invention to enable the formation of a uniformly continuous hardened surface layer having a desired thickness on a part or the whole of the surface of a molded product in a foaming-in-place molding process which does not greatly differ from any customary process.

This object is attained by, for example, a foam molded product of a synthetic resin made from particles of a foamable synthetic resin in a mold for foam-in-place molding, and having a continuous hardened surface layer formed during the foam-in-place molding of the product by hardening a molten resin layer formed from particles melted as a result of their contact with a mold surface heated to or above the melting point of the resin. The above object is also attained by a foam molded product of a synthetic resin made from particles of a foamable synthetic resin in a mold for foam-in-place molding, and having a continuous hardened surface layer formed during the foam-in-place molding of the product by hardening a molten resin layer formed from particles melted as a result of their contact with a mold surface heated to or above the melting point of the resin which is caused at least temporarily by the application of pressure to the particles filling the mold.

According to a preferred form of the product, the hardened surface layer and the resin particles underlying it have a boundary in which the hardened surface layer is partly formed by a part of the underlying particles melted and bonded to the layer. According to a still preferred form of the product, the hardened surface layer contains closed cells distributed therein. According to a preferred form of the product, the hardened surface layer contains a multiplicity of cells flattened across its thickness. According to a still preferred form of the product, the resin is a polystyrene or polyolefin resin.

The above object is also attained by a foam molded product of a synthetic resin made from particles of a foamable synthetic resin in a mold for foam-in-place molding, and having a continuous hardened surface layer formed during the foam-in-place molding of the product by hardening a molten resin layer formed from an unfoamed synthetic resin in particulate, powdered, flaky, or like form melted as a result of its adherence or contact with a mold surface heated to or above the melting point of the unfoamed synthetic resin. The object is also attained by a foam molded product of a synthetic resin made from particles of a foamable synthetic resin in a mold for foam-in-place molding, and having a continuous hardened surface layer formed during the foam-in-place molding of the product by hardening a molten resin layer formed from a sheet of a synthetic resin melted as a result of its contact with a mold surface heated to or above the melting point of the sheet.

According to another aspect of this invention, there is provided a process for manufacturing a foam molded product of a synthetic resin which comprises the steps of heating at least a part of the molding surface of a foaming-in-place mold composed of two portions to or above the melting point of a feedstock of particles of a foamable synthetic resin which will fill the mold when it is closed; filling with the feedstock the mold closed by mating the two portions thereof, while leaving therebetween a clearance which is larger than an ordinary crack clearance; causing particles of the resin to contact the heated part of the molding surface and melt to form a molten resin layer; and hardening the molten resin layer form a continuous hardened surface layer on the surface of a product molded from the feedstock in the mold. There is also provided a process for manufacturing a foam molded product of a synthetic resin which comprises the steps of heating at least a part of the molding surface of a foaming-in-place mold composed of two portions to or above the melting point of a feedstock of particles of a foamable synthetic resin which will fill the mold when it is closed; filling with the feedstock the mold closed by mating the two portions thereof, while leaving therebetween a clearance which is larger than an ordinary crack clearance; applying pressure to the feedstock to cause particles of the resin to contact the heated part of the molding surface at least temporarily and melt to form a molten resin layer; and hardening the molten resin layer to form a continuous hardened surface layer on the surface of a product molded from the feedstock in the mold.

According to a preferred mode of the process, the step of heating at least a part of the molding surface is started prior to any other step, and the step of forming a molten resin layer is started simultaneously with the step of filling the mold with the feedstock. According to a preferred mode of the process, the mold is completely closed after the step of filling it with the feedstock, and the step of forming a molten resin layer is continued until after the mold has been completely closed.

The step of hardening the molten resin layer is preferably followed by an ordinary foam-molding step. The feedstock is preferably a resin having an expansion ratio of from 3 to 150. The hardened surface layer preferably has a thickness of 0.1 to 5.0 mm. The feedstock is preferably a polystyrene or polyolefin resin.

There is also provided a process for manufacturing a foam molded product of a synthetic resin which comprises the steps of heating at least a part of the molding surface of a foaming-in-place mold composed of two portions to or above the melting point of an unfoamed synthetic resin in particulate, powered, flaky, or like form which will be caused to adhere to, or contact that part of the molding surface; causing the unfoamed synthetic resin to adhere to, or contact the heated part of the molding surface and melt to form a molten resin layer; hardening the molten resin layer to form a continuous hardened surface layer in an area which will define the surface of a product to be molded; and filling the mold closed by mating the two portions thereof with a feedstock of particles of a foamable synthetic resin to make a foam molded product carrying the hardened surface layer on its surface.

There is also provided a process for manufacturing a foam molded product of a synthetic resin which comprises the steps of heating at least a part of the molding surface of a foaming-in-place mold composed of two portions to or above the melting point of an unfoamed synthetic resin in particulate, powdered, flaky, or like form which will fill the mold closed by mating the two portions thereof, and be so sized and shaped as to be capable of circulation by air; filling the closed mold with the unfoamed synthetic resin; causing the unfoamed synthetic resin to contact the heated part of the molding surface and melt to form a molten resin layer; removing any unmelted remainder of the resin from the mold; hardening the molten resin layer to form a continuous hardened surface layer in an area which will define the surface of a product to be molded; and filling the mold with a feedstock of particles of a foamable synthetic resin to make a foam molded product carrying the hardened surface layer on its surface.

There is also provided a process for manufacturing a foam molded product of a synthetic resin which comprises the steps of heating at least a part of the molding surface of a foaming-in-place mold composed of two portions to or above the melting point of an unfoamed synthetic resin in particulate, powdered, flaky, or like form which will be fed into the mold closed by mating the two portions thereof, and be so sized and shaped as to be capable of circulation by air; feeding the closed mold with the unfoamed synthetic resin; circulating the unfoamed synthetic resin by air to cause it to adhere to the heated part of the molding surface and melt to form a molten resin layer; removing any unmelted remainder of the resin from the mold; hardening the molten resin layer to form a continuous hardened surface layer in an area which will define the surface of a product to be molded; and filling the mold with a feedstock of particles of a foamable synthetic resin to make a foam molded product carrying the hardened surface layer on its surface.

There is also provided a process for manufacturing a foam molded product of a synthetic resin which comprises the steps of heating the molding surface of one of two portions of a foaming-in-place mold to or above the melting point of a sheet of a synthetic resin which will be supplied into the mold; opening the mold and supplying it with the sheet of a synthetic resin which is at least as large as the heated molding surface; closing the mold and filling it with a feedstock of particles of a foamable synthetic resin which is supplied through the other portion of the mold, and which can be fused with the sheet; causing the sheet to adhere to the heated molding surface and melt to form a molten resin layer thereon; and hardening the molten resin layer to form a continuous hardened surface layer on the surface of a product molded from the feedstock. According to a preferred mode of the process, the sheet is preheated before it is supplied into the mold.

According to still another aspect of this invention, there is provided a mold for foam-in-place molding composed of two portions, and having means provided behind at least a part of its molding surface for heating that part to or above the melting point of a feedstock of particles of a foamable synthetic resin which will fill the mold closed by mating the two portions thereof. According to a preferred form of the mold, the heating means is a heater enclosed in a closed space defined behind that part of the molding surface.

BEST MODE OF CARRYING OUT THE INVENTION

Foam molded products, processes and molds embodying this invention will now be described in further detail with reference to the accompanying drawings.

Figure 1:
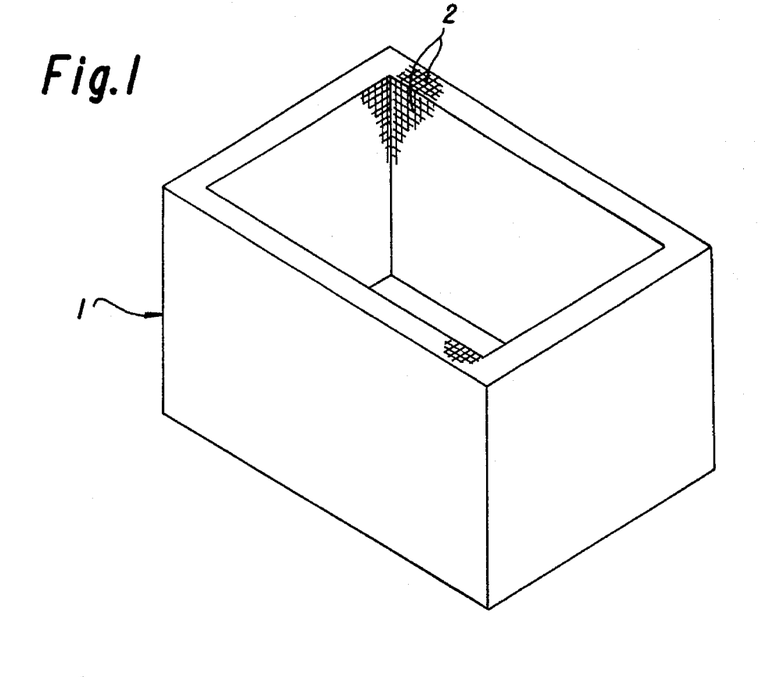
FIG. 1 is a perspective view of a foam molded product of a synthetic resin embodying this invention.

FIG. 1 shows a shock absorbing material as a foam molded product of a synthetic resin embodying this invention. The molded product 1 has been made by foaming and fusing particles of a foamable synthetic resin in a foaming-in-place mold composed of two portions. It has a continuous hardened surface layer 2 formed during its foam-in-place molding by the hardening of molten particles on its inner surface, including its top edge, which will be exposed from a packing box in which it is put, and which will remain in contact with its contents. The hardened surface layer 2 imparts an improved peeling and depression resistance to the molded product 1.

Figure 2:
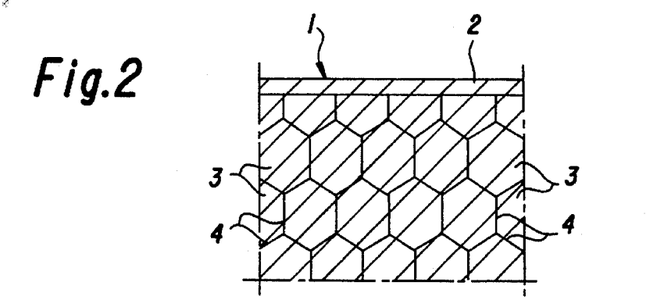
FIGS. 2 and 3 are each a diagrammatic view showing the structure of the product embodying this invention.
Figure 3:
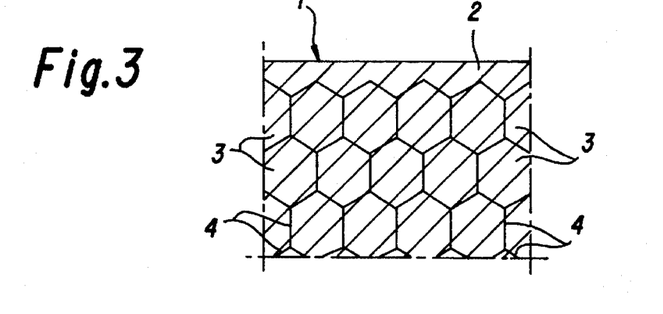

FIGS. 2 and 3 show diagrammatically the structure of the inner surface portion of the molded product including the hardened surface layer 2 and foamed and fused resin particles 3 underlying it. The continuous hardened surface layer 2 is formed during the foam-in-place molding of the molded product 1 by hardening a molten resin layer formed from resin particles melted as a result of their contact with the corresponding part of the molding surface of the mold heated to or above the melting point of the resin particles. It is necessary to form the molten resin layer uniformly on the heated part of the molding surface to ensure that the continuous hardened surface layer 2 be uniformly formed. When the molten resin layer is formed, therefore, the mold is completely closed to cause not only the outermost layer of resin particles, but also at least the immediately underlying layer of resin particles to contact the hated part of the molding surface and melt. FIGS. 2 and 3 show different forms of boundary between the hardened surface layer 2 and the underlying resin particles 3. In the product shown in FIG. 2, the hardened surface layer 2 and the underlying resin particles 3 have a boundary in which the hardened surface layer 2 is partly formed by the resin particles 3 melted partly and bonded to the layer 2. In the product shown in FIG. 3, however, the resin particles 3 are merely fused with the hardened surface layer 2, while retaining their original shapes.

The resin particles may be of a foamable polystyrene resin, or of a foamable polyolefin resin, such as polyethylene or polypropylene, or of a foamable copolymer resin. A polyolefin resin is, among others, preferred, since the hardened surface layer 2 is easy to form from such a resin. Moreover, the use of a polypropylene resin is particularly beneficial when the molded product is a container having a cover as an integral part thereof, since the resin can form a hardened surface layer 2 having a high flexural strength and can, therefore, form a strong hinge or hinges connecting the container and the cover. Although the resin may be a crosslinked or uncrosslinked one, the use of an uncrosslinked resin is preferred to ensure the formation of a good hardened surface layer 2.

It is beneficial to use prefoamed resin particles, though it is also possible to use particles which have not been prefoamed. If prefoamed particles are used, they preferably have an expansion ratio of from 3 to 150, though it may vary to some extent with the resin employed. More specifically, it is preferable to use prefoamed particles of a polystyrene resin having an expansion ratio of from 3 to 100, more preferably from 3 to 50, or prefoamed particles of a polyolefin resin having an expansion ratio of from 3 to 60, more preferably from 3 to 45. The particles preferably have a diameter of 1 to 10 mm, though it may vary to some extent with the resin employed.

The particles underlying the hardened surface layer 2 do not necessarily need to be of the same kind with the particles forming the hardened surface layer 2, but may also be a different kind of particles which can be fused with the hardened surface layer 2. The term "different kind of particles" as herein used means not only particles of a different resin, but also particles of the same resin which have a different expansion ratio, or diameter, or which are not colored if the particles forming the layer 2 are colored, or vice versa, or which are differently colored from the particles forming the layer 2. The particles of a different resin may, for example, be of a polystyrene resin if the particles forming the hardened surface layer 2 are of a polypropylene resin, or vice versa. There are, however, cases where the particles are of a different resin which is not fusible with the resin forming the hardened surface layer.

The hardened surface layer 2 has a thickness of 0.1 to 5.0 mm, preferably 0.3 to 5.0 mm, depending on the expansion ratio of the particles employed, and the width of a clearance left between the mated mold portions to allow for the feeding of the particles into the mold less the width of an ordinary crack clearance, as will hereinafter be stated in further detail.

Figure 4:
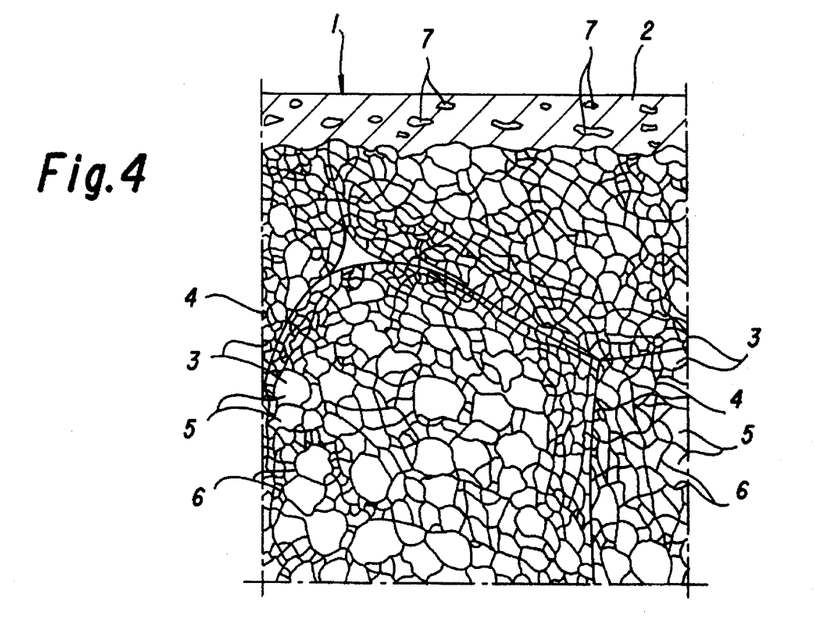
FIGS. 4 and 5 are each a view showing the structure of the product embodying this invention in a magnification of 20.
Figure 5:
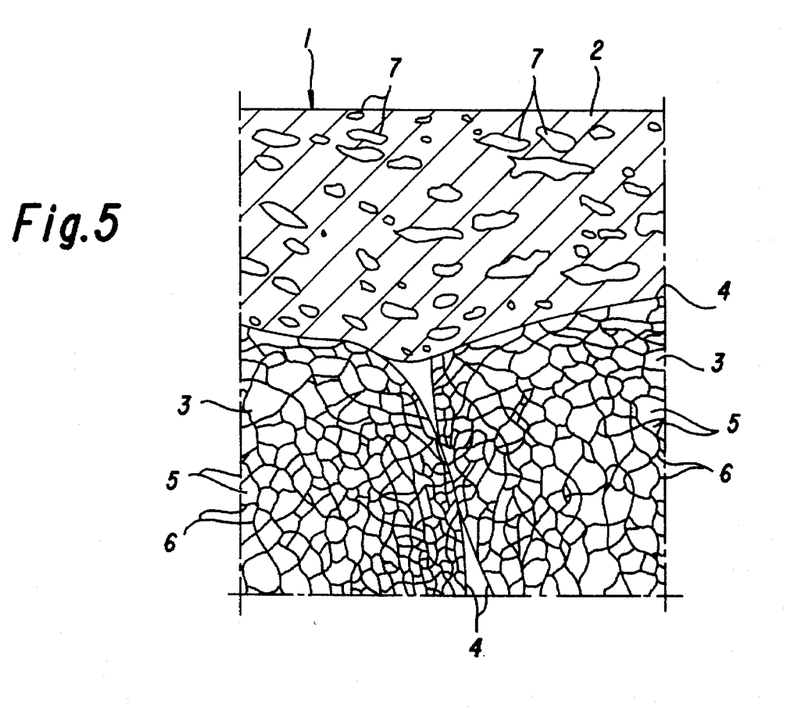

FIGS. 4 and 5 each show the structure of the inner surface portion of the molded product 1 in a magnification of 20. FIG. 4 corresponds to FIG. 2, and FIG. 5 to FIG. 3. The foamed and fused particles have skins 4, and each particle has a multiplicity of cells 5 defined by membranes 6. The hardened surface layer 2 contains closed cells 7 distributed therein, as shown in FIGS. 4 or 5. The cells 7 are apparently formed by a decomposable or volatile foaming agent, or a vaporized product such as air, or gas which is present in the cells of the starting resin particles before they are fed into the mold. The majority of the cells 7 are flattened across the thickness of the hardened surface layer 2, and include ones having elongated ends, as shown in FIGS. 4 or 5, apparently as a result of the contact under pressure of the particles with the heated part of the molding surface which takes place at least temporarily during the formation of the layer 2. Thus, the hardened surface layer 2 contains a multiplicity of cells 7 which are so shaped a to give the molded product 1 as a whole good properties of absorbing shock and restoring its shape.

The hardened surface layer 2 of the molded product 1 can alternatively be formed from an unfoamed synthetic resin in particulate, powdered, flaky, or like form which is melted in the mold. It can also be formed from a sheet of a synthetic resin melted in the mold. In either event, the resin may be the same with a feedstock of particles used for making the molded product, or a different resin which is fusible, or even not fusible, with the feedstock resin. More specifically, it is possible to use, for example, an ethylene-vinyl acetate copolymer for making the hardened surface layer, and a foamable polyolefin resin such as polyethylene or polypropylene, as a combination of different resins which are fusible together.

Figure 6:
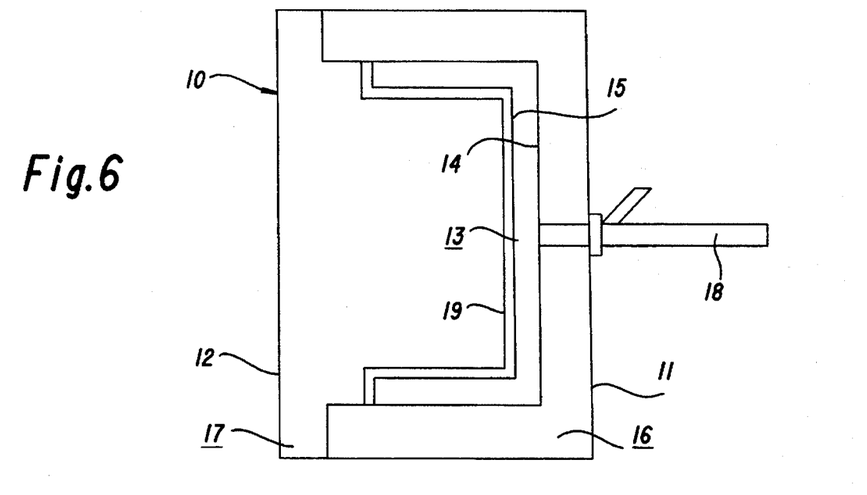
FIG. 6 is a schematic view of a mold for foam-in-place molding which will be employed for describing a process embodying this invention.
Figure 7:
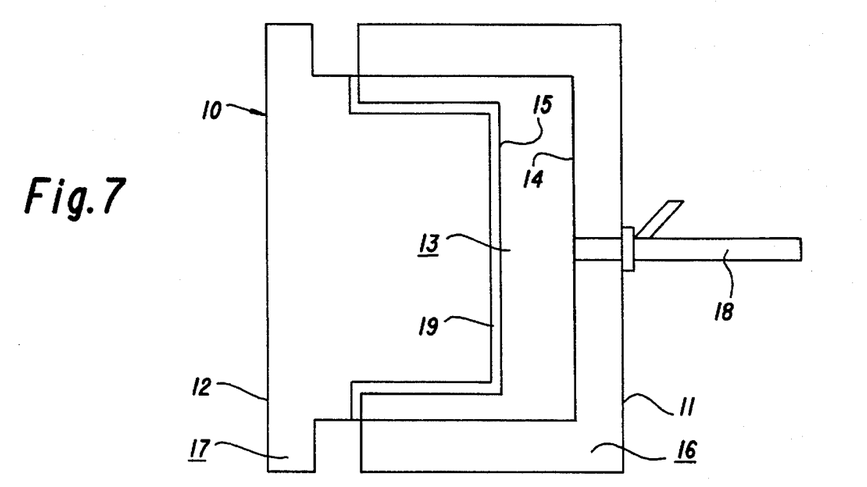
FIG. 7 is a view similar to FIG. 6, but showing the mold in its operative position.

Description will now be made of a process for manufacturing the molded product 1 shown in FIG. 1 with reference to FIGS. 6 and 7 showing a mold for foam-in-place molding schematically. The mold 10 is composed of two portions, i.e. a cavity mold portion 11 and a core mold portion 12. The cavity and core mold portions 11 and 12 are vertically disposed, and the core mold portion 12 can be retracted horizontally to the left, as viewed in FIG. 6, so as to be separated from the cavity mold portion 11 to open the mold. The cavity and core mold portions 11 and 12 mated to close the mold define therebetween a mold cavity 13 in which the product 1 is molded. The cavity mold portion 11 has a molding surface 14 facing the mold cavity 13, and the core mold portion 12 likewise has a molding surface 15 facing the mold cavity 13. The cavity mold portion 11 has a closed heating chamber 16 behind its molding surface 14, and the core mold portion 12 likewise has a closed heating chamber 17 behind its molding surface 15. The mold is provided with a feedstock feeder 18 for feeding a feedstock of particles of a foamable synthetic resin into the mold cavity 13. The core mold portion 12 is provided immediately behind its molding surface 15 with means 19 for heating the molding surface 15.

Description will now be made of the use of the mold 10 for making the molded product 1 shown in FIG. 1. As a first step, the whole molding surface 15 of the core mold portion 12 is heated by the heating means 19 to or above the melting point of the feedstock, for example, to or above about 200° C. if the feedstock is of a polystyrene or polyolefin resin. As a second step, the feedstock is fed by a force of air through the feeder 18 into the mold cavity 13 defined by and between the cavity and core mold portions 11 and 12 mated to close the mold, while leaving therebetween a clearance of, say, 10 to 150 mm which is larger than an ordinary crack clearance ranging usually from 3 to 5 mm, as shown in FIG. 7. As a third step, the cavity and core mold portions 11 and 12 are completely mated to close the mold completely. As a fourth step, which is started simultaneously with the second step, resin particles are caused to contact the heated molding surface 15 of the core mold portion 12 and melt to form a molten resin layer on the whole molding surface 15. Immediately upon the ending of the third step, or upon passage of a certain length of time up to, say, 150 seconds thereafter, cooling water, for example, is supplied into the heating chamber 17 in the core mold portion 12 to cool it, whereupon the fourth step ends. As a fifth step, the molten resin layer is hardened to form a continuous hardened surface layer 2 along the whole molding surface 15 of the core mold portion 12. The hardened surface layer 2 and the resin particles underlying it define therebetween a boundary in which the hardened surface layer 2 is partly formed by the underlying particles melted partly and bonded to the layer 2, or in which the foamed particles, which may or may not be fused together, are fused to the layer 2, while retaining their original form.

The fourth step of forming the molten resin layer is started simultaneously with the second step of feeding the mold cavity 13 with the feedstock, and is continued until after the third step of closing the mold completely is over, as hereinabove stated. This is due to the necessity of forming the molten resin layer uniformly on the whole molding surface 15 of the core mold portion 12 to ensure that the continuous hardened surface layer 2 be uniformly formed. When the cavity and core mold portions 11 and 12 are mated to close the mold completely, the resin particles filling the mold cavity 13 are pressed against the heated molding surface 15 of the core mold portion 12, and more specifically, against the vertical portion of the molding surface 15 by the force applied to close the mold and the reaction of the particles to a compressive force, and against its horizontal portions by the reaction of the particles to a compressive force. Therefore, it is not only the outermost layer of particles facing the molding surface 15, but also at least the immediately underlying layer of particles that can be caused to contact the heated molding surface 15 and melt. During the latter part of the fourth step in which the molten resin layer increases its thickness, the resin particles fill the area behind it and enable it to grow uniformly without flowing down the vertical portion of the molding surface 15.

As a sixth step, vapor is supplied into the heating chamber 16 of the cavity mold portion 11, and heated to an ordinary foam-molding temperature, for example, in the range of, say, 105° C. to 110° C. if the feedstock is a polystyrene or polyolefin resin, so that the resin particles in the mold cavity 13 may be foamed and fused together in an ordinary way. Then, cooling water, for example, is supplied into the heating chamber 16 to cool the molded product. Finally, the core mold portion 12 is retracted away from the cavity mold portion 11 to open the mold, and the molded product 1 having the hardened surface layer 2 formed on its inner surface and the edge of its top opening along the molding surface 15 is removed from the mold.

The thickness A (mm) of the hardened surface layer 2 formed on the surface of the molded product 1 during its foam-in-place molding depends on the expansion ratio B of the resin particles employed, and the width C (mm) equal to that of the clearance left between the cavity and core mold portions 11 and 12 for allowing the feeding of the resin particles into the mold cavity 13 less the width of an ordinary crack clearance, and is represented by the equation:

$$A\ (mm) = B/C$$

For example, therefore, the hardened surface layer 2 has a thickness A of 1 mm if the resin particles have an expansion ratio B of 30 and the clearance width C is 30 mm. If the width of the clearance left between the cavity and core mold portions 11 and 12 exceeds a certain level, the thickness A of the hardened surface layer 2 depends solely on it and the expansion ratio B of the resin particles.

After the third step of closing the mold completely, it is possible to separate the cavity and core mold portions 11 and 12 again to make a clearance therebetween. In such a case, it is possible to feed the mold with an additional supply of resin particles through the clearance.

A force of compressed air can also be employed for feeding the mold cavity 13 with the resin particles.

The first step of heating the molding surface 15 can alternatively be started simultaneously with the second step of feeding the mold cavity 13 with the resin particles, or after the second step has been started, or after it has been ended.

It is also possible to supply the heating chamber 17 of the core mold portion 12 with vapor after the third step, instead of, for example, cooling water as hereinabove stated, so that an ordinary foam-molding temperature may be established in the mold.

While it is necessary to heat the molding surface 15 of the core mold portion 12 to or above the melting point of the resin particles, for example, to or above about 200° C. as hereinabove stated, it is recommended that trial molding be made for the selection of the optimum temperature which may vary from one resin to another. Incidentally, the hardened surface layer 2 presents a more beautiful surface when formed at a low temperature.

If the core mold portion 12 has a sufficiently small wall thickness to allow a large loss of heat, it is allowed to cool to some extent or other as a result of its loss of heat to melt the resin particles. The core mold portion 12 can be heated to an excessively high temperature, and cooled thereafter as a result of its contact with the resin particles, if it has a sufficiently small wall thickness.

Figure 8:
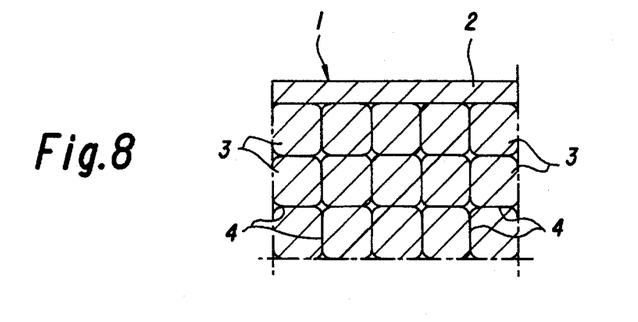
FIG. 8 is a diagrammatic view showing the structure of another product embodying this invention.

Reference is now made to FIG. 8 showing diagrammatically the structure of a surface portion of a molded product 1 having a hardened surface layer 2 formed on the whole surface thereof. The hardened surface layer 2 formed on the whole surface of the molded product 1 makes it impermeable to vapor or any other heating medium and confines resin particles 3 in a compressed state without allowing them to be foamed and fused together. The particles 3 have skins as shown at 4.

Figure 9:
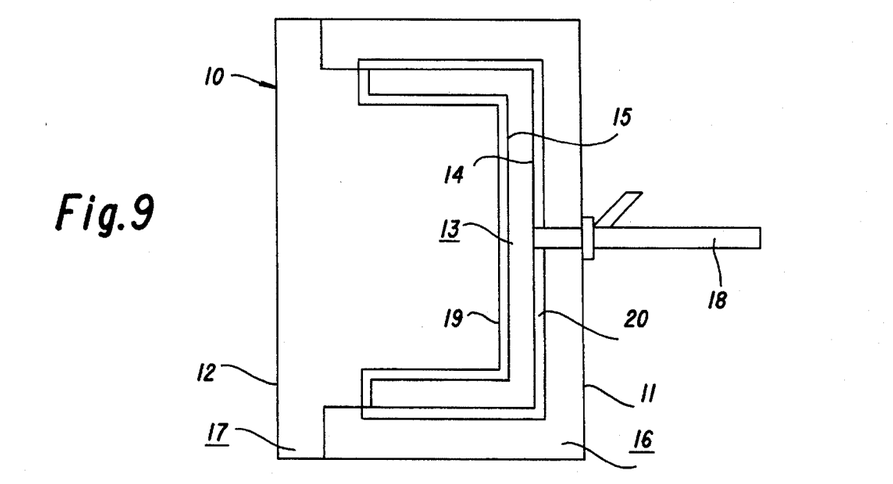
FIG. 9 is a schematic view of a mold which will be employed for describing a process for the foam-in-place molding of the product shown in FIG. 8.

FIG. 9 schematically shows a mold 10 for foam-in-place molding which can be used for making the molded product 1 shown in FIG. 8. The mold 10 has a core mold portion 12 provided with a heater 19 behind its molding surface 15, and a cavity mold portion 11 which is likewise provided with a heater 20 behind its molding surface 14. Once that the hardened surface layer 2 is formed, the molded product 1 is impermeable to vapor or any other heating medium, and therefore, the inner resin particles 3 are not foamed and fused together, but merely remain in a compressed state, as hereinabove stated. Accordingly, the removal of the inner resin particles from the molded product yields a hollow molded product. The hollow molded product can be filled with a different kind of particles, including ones which are not fusible with the hardened surface layer 2.

It is, however, possible to foam and fuse the inner resin particles if vapor or any other heating medium is blown into the mold cavity 13 through a pipe pierced through the hardened surface layer and having an outlet opening in the mold cavity 13.

A mold not shown, but having a heater 20 only behind the molding surface 14 of the cavity mold portion 11 is used for making a molded product 1 having a hardened surface layer 2 formed only on its outer surface.

Figure 10:
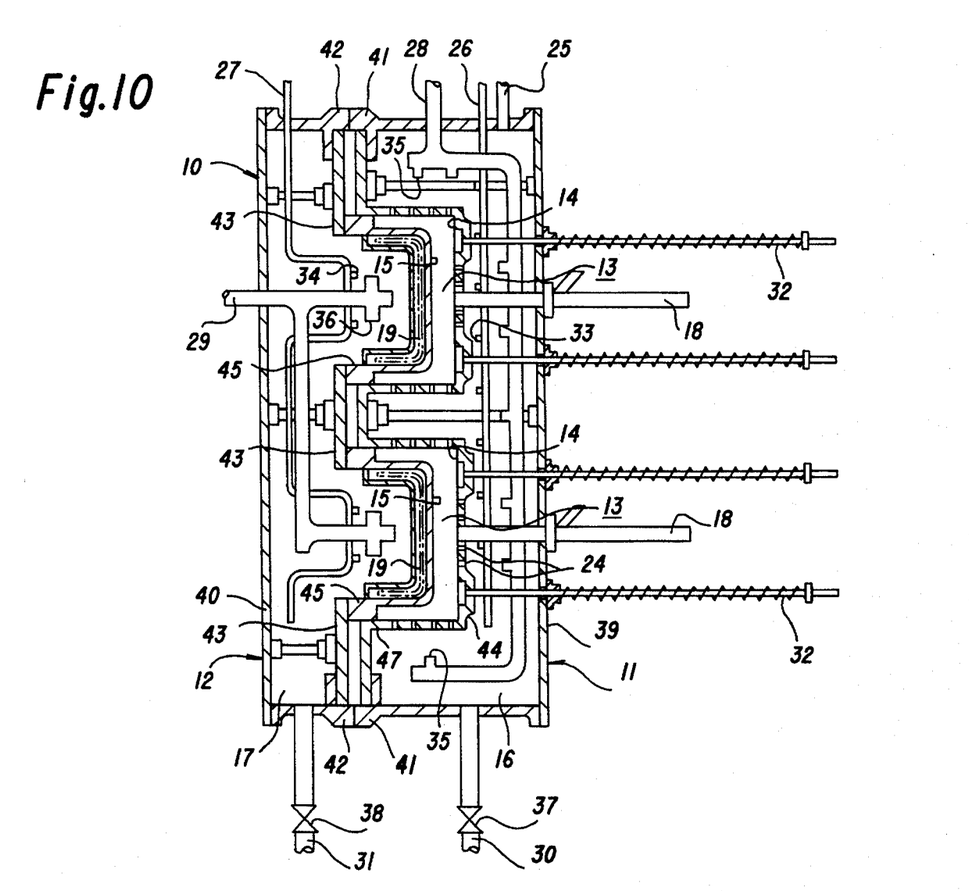
FIG. 10 is a sectional view of a mold for foam-in-place molding embodying this invention.
Figure 11:
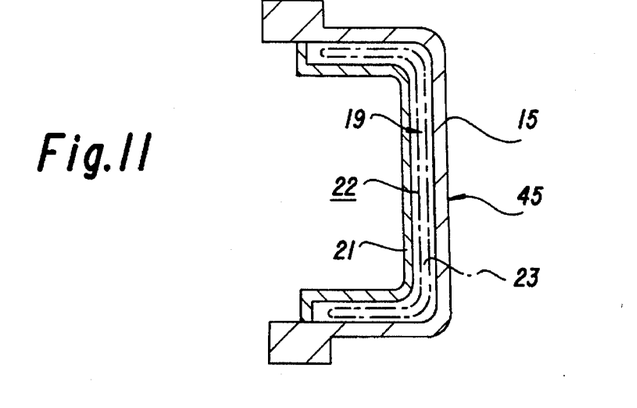
FIG. 11 is a sectional view of a surface member for the core portion of the mold shown in FIG. 10.

Attention is now directed to FIG. 10 showing by way of example a mold 10 which can be used for making the molded product 1 shown in FIG. 1. The mold 10 comprises a cavity mold portion 11 and a core mold portion 12 which are vertically disposed. The core mold portion 12 can be retracted away from the cavity mold portion 11 horizontally to the left, as viewed in FIG. 10, so as to open the mold 10. The cavity and core mold portions 11 and 12 define a mold cavity 13 therebetween when the mold is in its closed position. The cavity mold portion 11 has a molding surface 14 facing the mold cavity 13, and likewise, the core mold portion 12 has a molding surface 15 facing the mold cavity 13. The cavity mold portion 11 has a closed heating chamber 16 formed behind its molding surface 14, and likewise, the core mold portion 12 has a closed heating chamber 17 formed behind its molding surface 15. The mold 10 is provided with a feedstock feeder 18 for feeding the mold cavity 13 with a feedstock consisting of particles of a foamable synthetic resin. The core mold portion 12 is provided immediately behind its molding surface 15 with a heater 19 for heating the molding surface 15 to or above the melting point of resin particles. The heater 19 comprises a heating device 23 enclosed in a closed heating space 22 defined by a back wall 21 spaced inwardly apart from the molding surface 15, as shown in FIG. 11.

The molding surface 14 of the cavity mold portion 11 is provided with vents 24 leading to its heating chamber 16. The core mold portion 12 has no such vent, since a molten resin layer formed on its molding surface 15 does not allow vapor or any other heating medium to pass therethrough. A vapor supply pipe 25 has one end connected to the heating chamber 16 of the cavity mold portion 11. A cooling water supply pipe 26 extends into the heating chamber 16 of the cavity mold portion 11, and another cooling water supply pipe 27 into the heating chamber 17 of the core mold portion 12. An air supply pipe 28 extends into the heating chamber 16, and another air supply pipe 29 into the heating chamber 17. A drain pipe 30 is connected to the heating chamber 16, and another drain pipe 31 to the heating chamber 17. The cavity mold portion 11 is provided with ejector pins 32. The cooling water supply pipes 26 and 27 have spray nozzles 33 and 34 facing the backs of the molding surfaces 14 and 15, respectively. The air supply pipes 28 and 29 has outlets 35 and 36 facing the backs of the molding surfaces 14 and 15, respectively. The drain pipes 30 and 31 are each provided with a valve 37 or 38.

Figure 12:
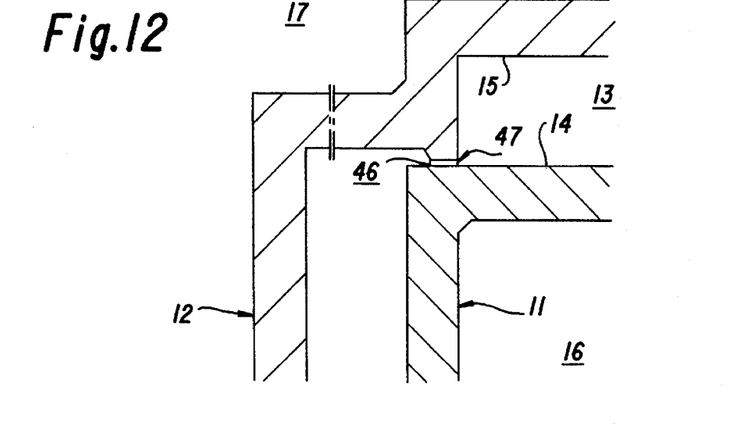
FIG. 12 is an enlarged sectional view of a part of the mold shown in FIG. 10.

The mold has back plates 39 and 40, side plates 41 and 42, inner plates 43, a surface member 44 defining the molding surface 14 of the cavity mold portion 11, and a surface member 45 defining the molding surface 15 of the core mold portion 12 which define the heating chambers 16 and 17. The heater 19 is provided in the surface member 45, as shown in FIG. 11. The inner surface of the cavity mold portion 11, or more specifically of the surface member 44, and the outer surface of the core mold portion 12, or more specifically of the surface member 45 define therebetween a joint 47 which forms a vent clearance having a width not allowing any resin particle to pass therethrough, as shown at 46 in FIG. 12, between when the mold is closed to the extent leaving between the cavity and core mold portions 11 and 12 a clearance which is larger than an ordinary crack clearance, and through which the mold cavity is fed with the feedstock, and when the mold is completely closed. The joint 47 is greater in length than its counterpart in any conventional mold, insofar as the clearance through which the mold cavity 13 is fed with the feedstock is larger than an ordinary crack clearance.

The cooling of the cavity and core mold portions 11 and 12 is effected by spraying cooling water through the nozzles 33 and 34 of the cooling water supply pipes 26 and 27, and thereafter blowing compressed air through the outlets 35 and 36 of the air supply pipes 28 and 29 to scatter away water.

Figure 13:
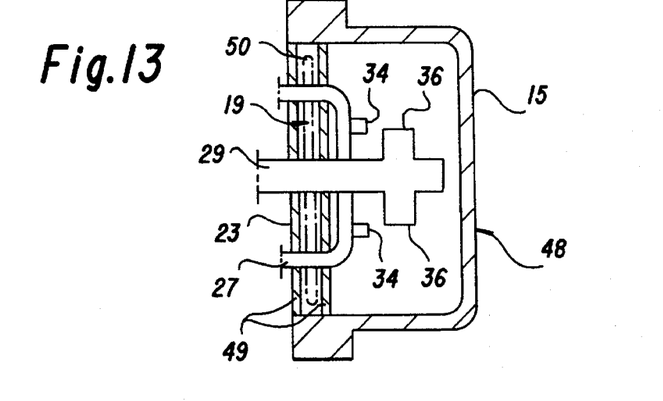
FIG. 13 is a sectional view of another form of surface member for the core portion of the mold.

FIG. 13 shows a surface member 48 defining the molding surface 15 of the core mold portion which is different in construction from the surface member 45 shown in FIG. 11, but is equally effective. The surface member 48 includes a pair of spaced apart walls 49 located at its end remote from the molding surface 15, and replacing the back wall 21 shown in FIG. 11. The walls 49 define therebetween a closed heating space 50 in which a heating device 23 is enclosed. The cooling water and air supply pipes 27 and 29 extend through the walls 49 and the heating space 50, so that the spray nozzles 34 and the outlets 36 may face the back of the molding surface 15.

Figure 14:
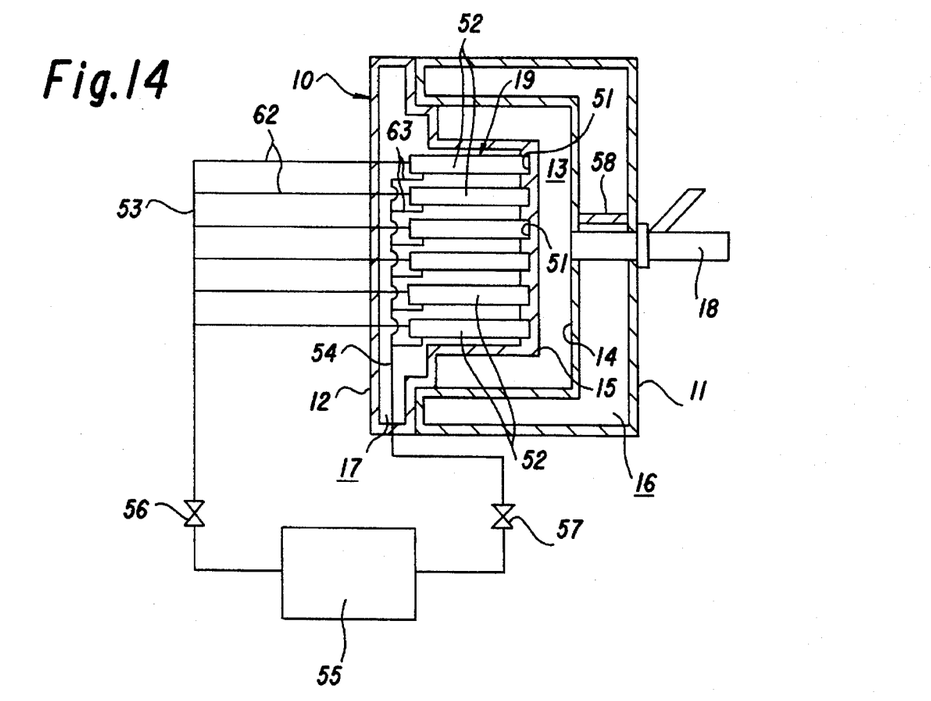
FIG. 14 is a sectional view of another mold embodying this invention.

Reference is now made to FIG. 14 showing a different form of mold 10 which can be used for making the molded product 1 shown in FIG. 1. The mold 10 is characterized by including a different form of heater 19 for heating the molding surface 15 of a core mold portion 12 to or above the melting point of the feedstock. A member having an outer surface defining the molding surfacer 15 has an inner surface defining a heating chamber 17, and provided with a plurality of recesses 51, and the heater 19 comprises a plurality of heating cartridges 52 mounted in the heating chamber 17, and each having one end fitted in one of the recesses 51. A heating medium, such as heated oil, can be circulated through the cartridge 52. A manifold 53 for supplying the heating medium such as heated oil, and a manifold 54 for discharging it are connected to the cartridges 52. A heating tank 55 is installed outside the mold 10 for heating the heating medium. The heating tank 55 contains, or carries thereon, an appropriate source of heat supply. Those ends of the manifolds 53 and 54 which are remote from the cartridges 52 are connected to the heating tank 55. The manifolds 53 and 54 are each provided with a valve 56 or 57.

Figure 15:
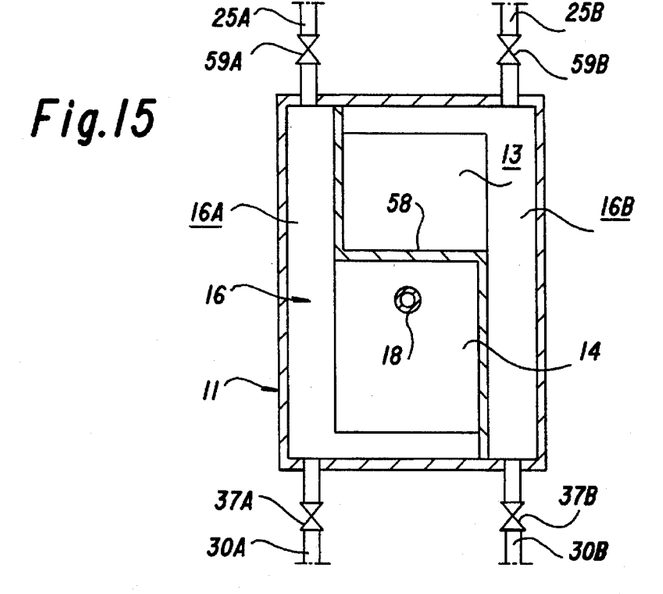
FIG. 15 is a sectional view of the mold shown in FIG. 14 which shows the back side of its cavity portion.
Figure 16:
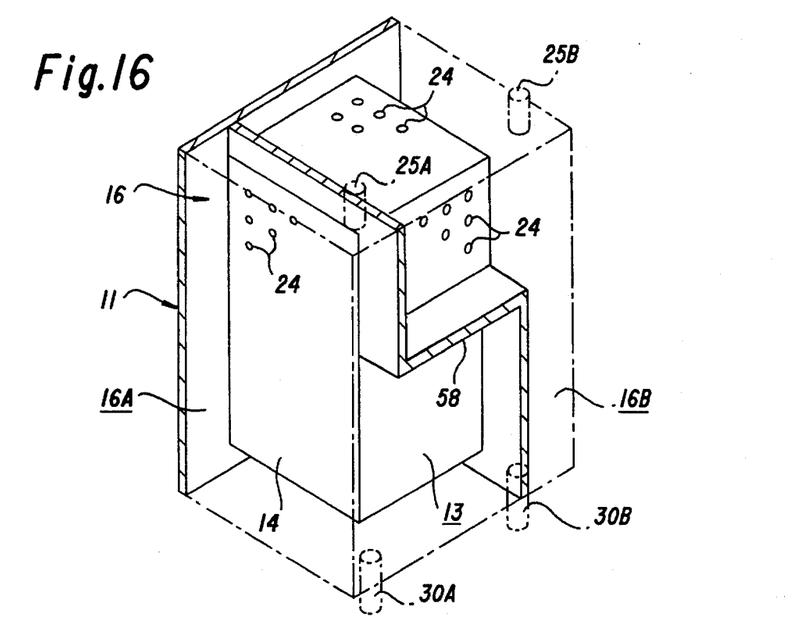
FIG. 16 is a perspective view, partly in section, of the mold shown in FIG. 14 which shows the back side of its cavity portion.

The mold 10, as well as the mold 10 shown in FIG. 10, has, however, the drawback that a molten resin layer formed on the molding surface 15 of the core mold portion 12 to form a hardened surface layer 2 prevents the core mold portion 12 from supplying heat to the feedstock in the mold cavity 13. The mold 10 shown in FIG. 14, therefore, has a partition 58 dividing the heating chamber 16 of a cavity mold portion 11 into a first heating zone 16A and a second heating zone 16B, and a vapor supply pipe 25A and a drain pipe 30A which are connected to the first heating zone 16A, as well as a vapor supply pipe 25B and a drain pipe 30B connected to the second heating zone 16B, as shown in FIGS. 15 and 16, so that the cavity mold portion 11 may be able to supply a sufficient amount of heat to the feedstock in the mold cavity 13. The vapor supply pipes 25A and 25B and the drain pipes 30A and 30B are each provided with a valve 59A or 59B, or 37A or 37B. The molding surface 14 of the cavity mold portion 11 has a multiplicity of vents 24 leading to its heating chamber 16.

Figure 17:
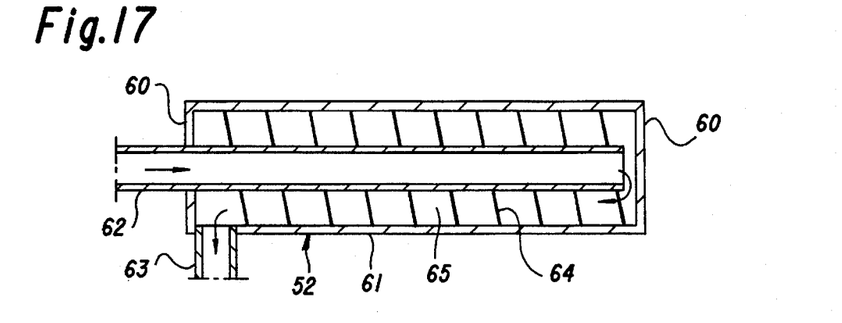
FIG. 17 is a sectional view of a heating cartridge.

Each heating cartridge 52 comprises a hollow cylindrical body 61 closed at both ends by end plates 60, as shown in FIG. 17. The manifold 53 for supplying the heating medium includes a plurality of supply pipes 62, and the manifold 54 for discharging it includes a plurality of discharge pipes 63. Each supply pipe 62 extends into one of the cartridges 52 through one end plate 60 substantially axially of the cylindrical body 61 and has an outlet opening located at a short distance from the other end plate 60, as shown in FIG. 17. Each discharge pipe 63 has an inlet opening connected to one of the cartridges 52 adjacent to the end plate 60 through which the supply pipe 62 extends into the cylindrical body 61. Each cartridge 52 has a spiral wall 64 connected between the inner surface of the cylindrical body 61 and the outer surface of the supply pipe 62, and defining a spiral flow path 65 for the heating medium between the outlet opening of the supply pipe 62 and the inlet opening of the discharge pipe 63, as shown in FIG. 17. The cartridges 52, or at least the cylindrical bodies 61 thereof, are made of copper or aluminum which is a good conductor of heat. If oil is used as the heating medium, it is possible to use, for example, silicone oil, or alkyl diphenyl.

Description will now be made of the mode in which vapor is supplied into the heating chamber 16 of the cavity mold portion 11 to heat it to an ordinary foam-molding temperature to form and fuse the resin particles in the mold cavity 13. First, the valve 59A in the vapor supply pipe 25A connected to the first heating zone 16A and the valve 37B in the drain pipe 30B connected to the second heating zone 16B are opened, while the valve 59B in the vapor supply pipe 25B connected to the second heating zone 16B and the valve 37A in the drain pipe 30A connected to the first heating zone 16A are closed, and vapor is supplied into the first heating zone 16A through the vapor supply pipe 25A, and from the first heating zone 16A to the second heating zone 16B through the mold cavity 13. Then, the valves 59A and 37B are closed, while the valves 59B and 37A are opened, and vapor is supplied into the second heating zone 16B, and from it to the first heating zone 16A through the mold cavity 13. Finally, the valves 59A and 59B are opened, while the valves 37A and 37B are closed, and vapor is supplied into the first or second heating zone 16A or 16B through the vapor supply line 25A or 25B, and from it to the other heating zone. The last-mentioned step is performed only once, or repeated. The resin particles in the mold cavity 13 can be foamed and fused together satisfactorily by the heat supplied only from the cavity mold portion 11, as hereinabove described.

Figure 18:
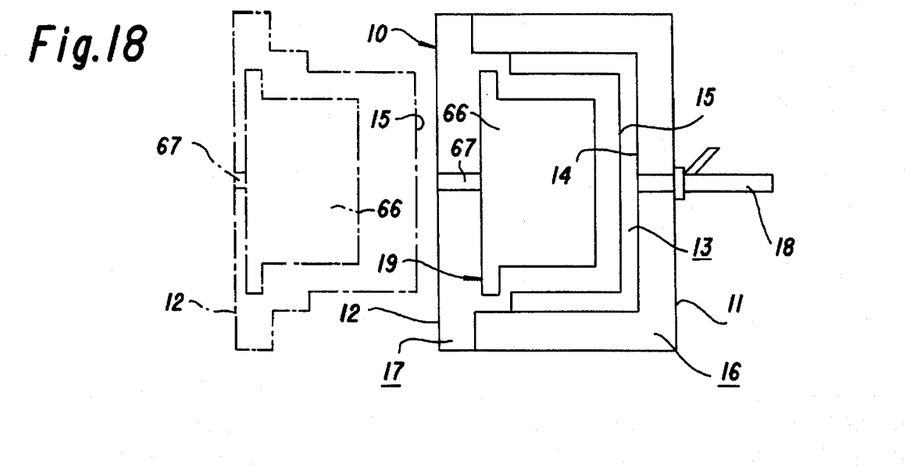
FIG. 18 is a schematic view of still another mold embodying this invention.

FIG. 18 shows a still different form of mold 10 which can be used for making the molded product 1 shown in FIG. 1. The mold 10 is characterized by including a source 66 of radiant heat supply as a heater 19 provided in the heating chamber 17 of a core mold portion 12 behind its molding surface 15. The source 66 of radiant heat supply may be stationary, or may be retractable away from the molding surface 15 by a retracting device 67, as shown, while continuing to supply heat. The source 66 may, for example, be an oil heater, or gas burner so positioned as to supply heat toward the molding surface 15.

Figure 19:
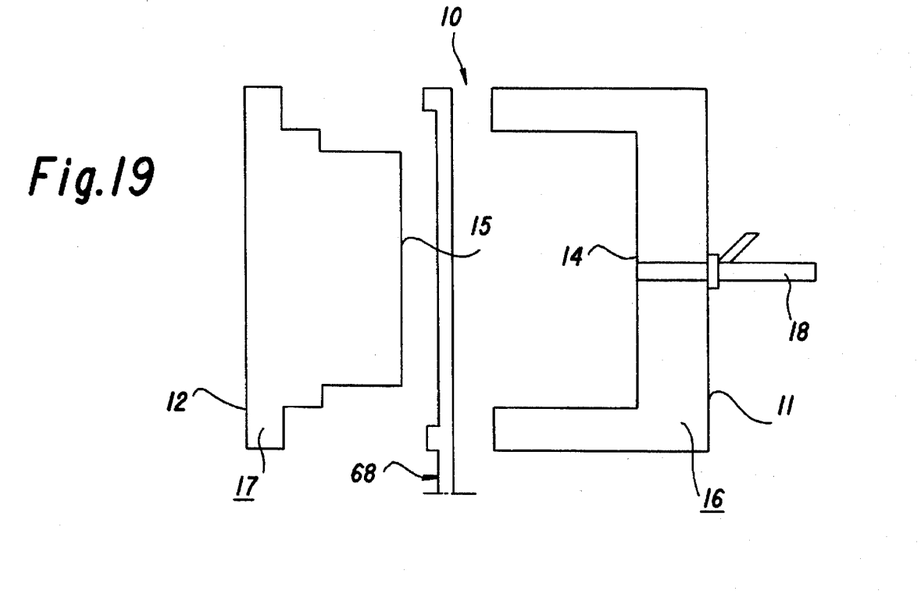
FIGS. 19 to 21 are each a schematic view of a different mold for foam-in-place molding which is used for carrying out a process embodying this invention.
Figure 20:
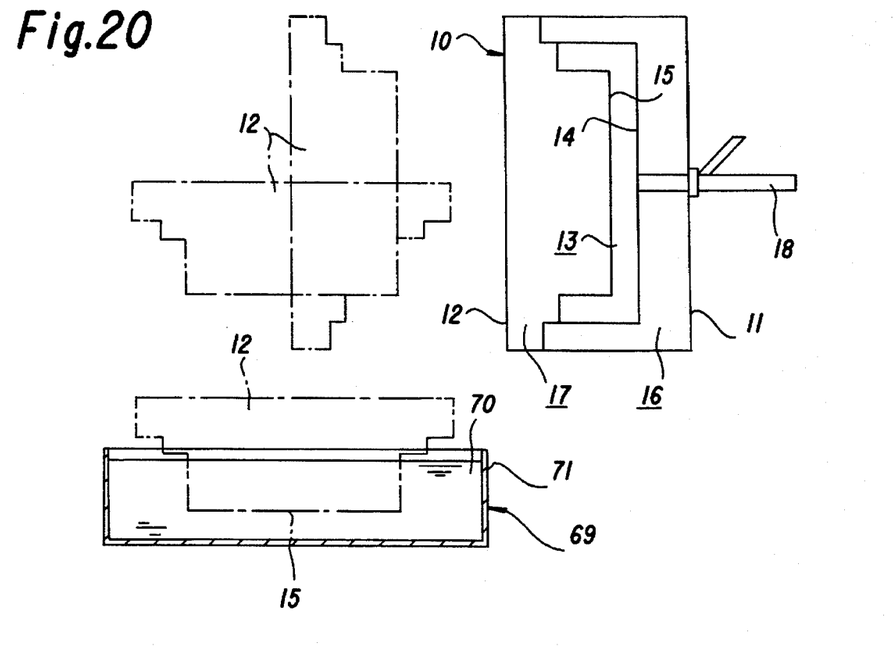
Figure 21:
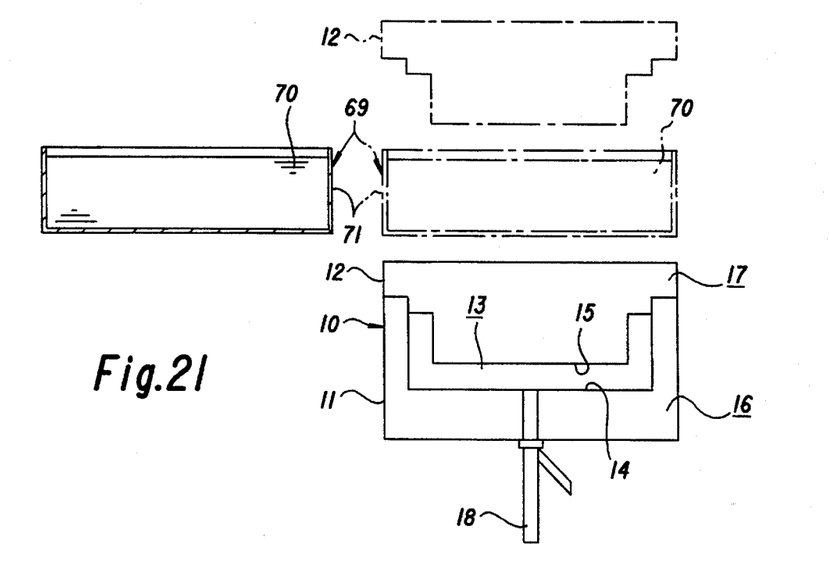

The molded product 1 shown in FIG. 1 can also be made by different forms of molds 10 which are schematically shown in FIGS. 19 to 21, respectively. Referring first to FIG. 19, a heater 68 is placed between the cavity and core mold portions 11 and 12 separated from each other for heating the molding surface 15 of the core mold portion 12. The heater 68 is retracted from between the cavity and core mold portions 11 and 12 before they are mated. The heater may comprise a source of radiant heat supply of the type which has been described with reference to FIG. 18. The molds shown in FIGS. 20 and 21 are both characterized by employing a heating tank 71 containing a heating medium 70, such as heated oil, as a heater 69 for heating the molding surface 15 of a core mold portion 12. After the core mold portion 12 has been separated from a cavity mold portion 11, the core mold portion 12 (FIG. 20), or both the core mold portion 12 and the heating tank 71 (FIG. 21) are moved, and the molding surface 15 of the core mold portion 12 is immersed in the heating medium 70 in the heating tank 71, and thereby heated.

Description will now be made of a process for manufacturing a foam molded product 1 of a synthetic resin having a hardened surface layer 2 formed from an unfoamed synthetic resin in particulate, powdered, flaky, or like form by employing the mold 10 shown in FIGS. 6 and 7. The particulate, powdered, flaky, or like material is so sized and shaped as to be capable of being conveyed by air. A pair of branches of a pipeline having one end connected to that end of the feedstock feeder 18 which is remote from the molding surface 14 are connected to a hopper containing the particulate, powdered, flaky, or like material, and a hopper containing a feedstock consisting of foamable particles of the same kind of resin with the particulate, powdered, flaky, or like material, respectively, and the pipeline, or each branch thereof is provided with a valve.

As a first step of the process, the molding surface 15 as a whole of the core mold portion 12 is heated to or above the melting point of the particulate, powdered, flaky, or like material. As a second step, the hopper containing the particulate, powdered, flaky, or like material is opened to supply it through the feedstock feeder 18 into the mold cavity 13 defined between the cavity and core mold portions 11 and 12 mated to close the mold, while leaving an ordinary crack clearance, or a larger clearance therebetween, as shown in FIG. 7. As a third step, the mold 10 is closed completely. As a fourth step, which is started simultaneously with the second step, the particulate, powdered, flaky, or like material is caused to contact the heated molding surface 15 of the core mold portion 12 and melt to form a molten resin layer covering the whole molding surface 15. As a fifth step, which is started immediately after the third step, or upon passage of an appropriate length of time thereafter, the unmelted particulate, powdered, flaky, or like material is removed from the mold cavity 13 through the feeder 18. The heating chamber 16 of the cavity mold portion 11 can be placed under pressure for the fifth step. Then, the core mold portion 12 is cooled, whereupon the fourth step ends. As a sixth step, the molten resin layer is hardened to form a hardened surface layer 2 along the whole molding surface 15 of the core mold portion 12. As a seventh step, the hopper containing the feedstock is opened to supply it into the vacant space of the mold cavity 13 through the feeder 18. As a eighth step, the cavity mold portion 11 is heated to an ordinary foam-molding temperature to make a foam molded product in an ordinary way.

The fifth step of removing the unmelted material can be postponed until after the sixth step of forming the hardened surface layer 2. Although the process includes the steps of supplying the particulate, powdered, flaky, or like material into the mold cavity 13, and removing the unmelted material after the formation of the molten resin layer, it can be carried out in a variety of different ways, basically as when the feedstock is supplied into the mold cavity. If the particulate, powdered, flaky, or like material is so sized and shaped as to be capable of being conveyed by air, it is possible to circulate it in the mold cavity 13 by a stream of air for an appropriate length of time to form the molten resin layer. It is also possible to inject or spray the material against the molding surface 15 of the core mold portion 12 through nozzles to form the molten resin layer thereon. The particulate, powdered, flaky, or like material and the feedstock can be of different resins which are fusible with each other.

The hardened surface layer 2 can be formed on the whole surface of the molded product 1 if the mold 10 shown in FIG. 9 is employed.

Figure 22:
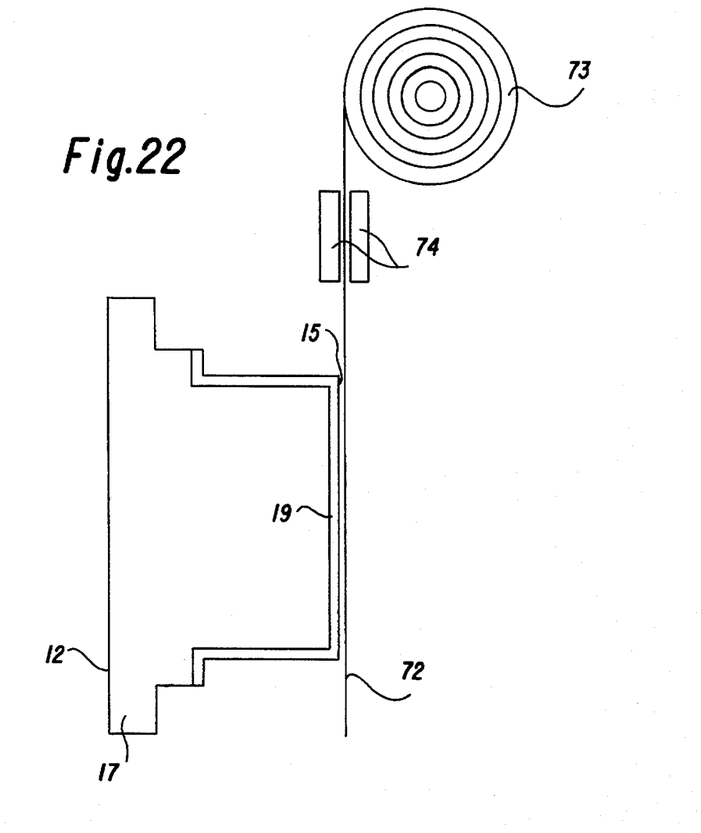
FIG. 22 is a schematic view of a part of a mold for foam-in-place molding which will be employed for describing another process embodying this invention.

Description will finally be made of a process for making a molded product 1 having a hardened surface layer 2 formed from a sheet of a synthetic resin by the mold 10 shown in FIGS. 6 and 7. The process employs a roll 73 of a sheet 72 of an unfoamed synthetic resin having at least a width covering the whole molding surface 15 of the core mold portion 12. The roll 73 is positioned above the mold to supply the sheet 72 to the space defined between the cavity and core mold portions 11 and 12 when they are separated from each other, as shown in FIG. 22. A preheater 74 is provided between the mold and the roll 73 for preheating the sheet 72 to a temperature which is lower than its melting point, but is at least equal to its softening point, before it is supplied into the space between the cavity and core mold portions 11 and 12. The preheater 74 may be an ordinary heater, or any other source of heat supply.

The sheet 72 is unwound from the roll 73, and is passed through the preheater 74 in which it is preheated by, for example, an electrical heater to an appropriate temperature, for example, in the range of 70° C. to 180° C., preferably 90° C. to 160° C., and more preferably 110° C. to 140° C., if the sheet 72 is of a polystyrene or polyolefin resin. The preheated sheet 72 is fed down into the space between the cavity and core mold portions 11 and 12, and the mold portions 11 and 12 are mated to close the mold to the extent leaving an ordinary crack clearance or a larger clearance therebetween, whereupon the sheet 72 is held therebetween. A foamable feedstock, which is of the same kind of resin with the sheet 72, is supplied into the mold cavity 13 through the feeder 18 to cause the sheet 72 to adhere to the whole molding surface 15 of the core mold portion 12.

The mold is, then, closed completely, whereupon any portion of the sheet 72 that projects beyond the edges of the molding surface 15 is cut off by cutting edges or blades provided on one or both of the cavity and core mold portions 11 and 12 along the edges of the molding surface 15.

The process can also be carried out in a variety of different ways, basically as when the feedstock, or the particulate, powdered, flaky, or like material is supplied into the mold cavity 13. The sheet 72 and the feedstock can alternatively be of different resins which are fusible with each other. If the mold 10 shown in FIG. 9 is employed, it is possible to form the hardened surface layer 2 on the whole surface of the molded product, including its outer surface on which the layer 2 is formed from the feedstock, while the layer 2 on its inner surface is formed from the sheet 72.

INDUSTRIAL UTILITY:

The foam molded product of this invention has a continuous hardened surface layer formed on a part or the whole of its surface by hardening a molten resin layer formed by melting a part of the feedstock resin, an unfoamed synthetic resin in particulate, powdered, flaky, or like form, or a sheet of a synthetic resin. Therefore, it has a high surface strength which improves the drawbacks found in any conventional product, depending on the purpose or mode of its use. The hardened surface layer does not easily peel off, nor is it easily depressed, even if something else may rub or strike against it. Moreover, it presents a beautiful surface. The product can be manufactured by a conventional foam molding machine if a slightly modified mold is employed. Therefore, the invention has a high level of industrial utility.

The formation of the hardened surface layer during the foam-in-place molding of the product as hereinabove described not only can be accomplished without calling for any substantial change in an ordinary foam-molding process, thereby enabling an efficient molding operation, but also makes it possible to prevent any wrinkling of the hardened surface layer. Moreover, the contact under pressure of the resin with the heated molding surface which is effected at least temporarily during the formation of the molten resin layer, enables the uniform formation of the continuous hardened surface layer without allowing any voids to be formed between it and the foamed and fused particles underlying it. The hardened surface layer has a thickness which can be selected as desired in accordance with the expansion ratio of the feedstock resin and the width which is equal to that of the clearance left between the two mold portions to allow the feeding of the feedstock resin into the mold cavity less the width of an ordinary crack clearance.

A decorative design, or a matte finish can be given to the hardened surface layer to improve the commercial value of the product if the relevant molding surface of the mold is formed with an appropriate pattern, or is covered with a net, or like object.

We claim:

1. A process for manufacturing a foam molded product from foamable particles of a polyolefin resin, which comprises:

heating at least a part of the molding surface of a two-portion mold for foam-in-place molding to at least the melting point of the particles;

mating the two portions of the mold to define a cavity therebetween leaving a clearance of 10 to 150 mm between the two portions;

feeding the foamable polyolefin resin particles to the cavity exerting pressure on the particles in the cavity to cause a part of the particles to contact the heated part of the molding surface and melt to form a molten resin layer thereon;

closing the mold completely, while continuing to form the molten resin layer; and hardening the molten resin layer to form a continuous hardened surface containing closed cells flattened across the thickness of the hardened surface.

2. A process according to claim 1, further comprising foam molding the particles in the cavity.

3. A process according to claim 1, wherein the foamable particles are prefoamed particles having an expansion ratio of 3 to 150.

4. A process according to claim 1, wherein the hardened surface layer has a thickness of 0.1 to 5.0 mm.

5. A process according to claim 1, wherein the polyolefin resin is polyethylene or polyprolene.

6. A foam molded product formed from foamable particles of a polyolefin resin by the process which comprises:

heating at least a part of the molding surface of a two-portion mold for foam-in-place molding to at least the melting point of the particles;

mating the two portions of the mold to define a cavity therebetween leaving a clearance of 10 to 150 mm between the two portions;

feeding the foamable polyolefin resin particles to the cavity exerting pressure on the particles in the cavity to cause a part of the particles to contact the heated part of the molding surface and melt to form a molten resin layer thereon;

closing the mold completely, while continuing to form the molten resin layer; and hardening the molten resin layer to form a continuous hardened surface layer containing closed cells flattened across the thickness of the hardened surface.

7. A foam molded product according to claim 6, wherein the polyolefin resin is polyethylene or polypropylene.

* * * * *